United States Patent
Bonarens et al.

(10) Patent No.: US 8,220,825 B2
(45) Date of Patent: Jul. 17, 2012

(54) METHOD AND DEVICE FOR FASTENING AN AIRBAG IN A MOTOR VEHICLE

(75) Inventors: Frank Bonarens, Oberursel (DE); Dietmar Breidert, Bischofsheim (DE); Matthias Brunner, Bad Schwalbach (DE); Benjamin De Buysscher, Kapellen (BE); Johannes Diehl, Saulheim (DE); Mathias Grube, Rüsselsheim (DE); Waldemar Medla, Gross-Gerau (DE)

(73) Assignee: GM Global Technology Operations LLC, Detroit, MI (US)

(*) Notice: Subject to any disclaimer, the term of this patent is extended or adjusted under 35 U.S.C. 154(b) by 254 days.

(21) Appl. No.: 12/438,912

(22) PCT Filed: Aug. 22, 2007
(Under 37 CFR 1.47)

(86) PCT No.: PCT/EP2007/058720
§ 371 (c)(1),
(2), (4) Date: Mar. 19, 2010

(87) PCT Pub. No.: WO2008/025709
PCT Pub. Date: Mar. 6, 2008

(65) Prior Publication Data
US 2010/0230936 A1  Sep. 16, 2010

(30) Foreign Application Priority Data
Aug. 26, 2006 (DE) .................. 10 2006 040 042

(51) Int. Cl.
*B60R 21/20* (2011.01)

(52) U.S. Cl. ................................ 280/728.2

(58) Field of Classification Search ............... 280/728.2, 280/730.2, 749; 411/173, 175, 182, 508–510, 411/913; 24/290, 291, 295, 297, 453
See application file for complete search history.

(56) References Cited

U.S. PATENT DOCUMENTS
2,041,613 A * 5/1936 Lincks .................... 439/804
(Continued)

FOREIGN PATENT DOCUMENTS
DE  102005045370 A1  4/2006
(Continued)

OTHER PUBLICATIONS
International Searching Authority, International Search Report for Application No. PCT/EP2007/058720, dated Oct. 31, 2007.
(Continued)

*Primary Examiner* — Paul N Dickson
*Assistant Examiner* — Robert A Coker
(74) *Attorney, Agent, or Firm* — Ingrassia Fisher & Lorenz, P.C.

(57) ABSTRACT

A method is provided for fastening an airbag to a motor vehicle, that includes, but is not limited to the steps of fastening an airbag, which can be filled with a gas and which has a fastening tab, to a fastening device which comprises a plate and a clip device fastened to the plate and the plate comprises a first plate section with a first opening having a screw thread and a second plate section, and the clip device is fastened on the first plate section, and the airbag is fastened to the fastening device by bending the second plate section in such a manner that the first plate section and the second plate section at least partially enclose the fastening tab on both sides. A fastening device is also provided for an airbag, an airbag, and a motor vehicle.

17 Claims, 4 Drawing Sheets

U.S. PATENT DOCUMENTS

| | | | | |
|---|---|---|---|---|
| 2,861,618 | A | * 11/1958 | Tinnerman | 411/175 |
| 3,009,499 | A | * 11/1961 | Weihe | 411/112 |
| 4,897,005 | A | * 1/1990 | Peterson et al. | 411/175 |
| 5,039,264 | A | * 8/1991 | Benn | 411/175 |
| 5,919,019 | A | * 7/1999 | Fischer | 411/182 |
| 7,374,200 | B2 | 5/2008 | Ikeda et al. | |
| 7,407,182 | B2 | 8/2008 | Aoki et al. | |
| 7,547,038 | B2 | * 6/2009 | Coleman | 280/728.2 |
| 7,597,342 | B2 | * 10/2009 | Cheal | 280/728.2 |
| 7,621,245 | B2 | 11/2009 | Lechner | |
| 2003/0015859 | A1 | * 1/2003 | Nakazawa | 280/728.2 |
| 2003/0042712 | A1 | 3/2003 | Henderson et al. | |
| 2003/0164607 | A1 | 9/2003 | Ronne et al. | |
| 2003/0222435 | A1 | 12/2003 | Schmidt et al. | |
| 2004/0000775 | A1 | * 1/2004 | Henderson et al. | 280/730.2 |
| 2005/0029778 | A1 | 2/2005 | Weber et al. | |
| 2005/0266700 | A1 | * 12/2005 | Jursich et al. | 438/785 |

FOREIGN PATENT DOCUMENTS

| | | |
|---|---|---|
| DE | 102005045923 A1 | 5/2006 |
| DE | 102006000846 A1 | 7/2007 |
| EP | 0795445 A1 | 9/1997 |
| JP | 2004122921 A | 4/2004 |

OTHER PUBLICATIONS

International Searching Authority, International Search Report for Appln. No. PCT/EP2007/0580720, dated Oct. 31, 2007.

* cited by examiner

METHOD AND DEVICE FOR FASTENING AN AIRBAG IN A MOTOR VEHICLE

CROSS-REFERENCE TO RELATED APPLICATIONS

This application is a U.S. National-Stage entry under 35 U.S.C. §371 based on International Application No. PCT/EP2007/058720, filed Aug. 22, 2007, which was published under PCT Article 21(2) and claims priority to German Application No. 102006040042.9, filed Aug. 26, 2006, which are all hereby incorporated in their entirety by reference.

TECHNICAL FIELD

The invention relates to a method and a fastening device for fastening an airbag to the bodywork of a motor vehicle. The invention further relates to an airbag module having such a fastening device and a motor vehicle.

BACKGROUND

The German Patent Application DE 10 2005 045 370 A1 describes a roof-side airbag having a plurality of mounting brackets. The mounting brackets are clipped to the vehicle interior of a motor vehicle or fastened to the motor vehicle by means of a screw and a nut. An advantage of the clipped mounting bracket is its relatively simple mounting.

A disadvantage of the roof-side airbag, however, is that the roof-side airbag is relatively difficult to remove from the motor vehicle, for example, when exchanging it. In most cases, during dismounting there is the risk that the clip or the opening provided for the clip in the interior lining of the motor vehicle will be damaged thereby.

Against this background, it is at least one object of the present invention to fasten an airbag as simply as possible to a motor vehicle, wherein in addition as simple as possible subsequent exchange of the airbag is possible. In addition, other objects, desirable features, and characteristics will become apparent from the subsequent summary and detailed description, and the appended claims, taken in conjunction with the accompanying drawings and this background.

SUMMARY

Accordingly, a method for fastening an airbag to a motor vehicle is provided, comprising the process step: fastening an airbag, which can be filled with a gas and which has a fastening tab, to a fastening device which comprises a plate and a clip device fastened to the plate, wherein the plate comprises a first plate section with a first opening having a screw thread and a second plate section, the clip device is fastened on the first plate section, and the airbag is fastened to the fastening device by bending the second plate section in such a manner that the first plate section and the second plate section at least partially enclose the fastening tab on both sides.

The airbag fastened to the fastening device with its fastening tab is ultimately provided for being installed in a motor vehicle, whereby the fastening device according to one embodiment of the method according to the invention is clipped to the motor vehicle. Due to the clipping, a relatively simple and rapid and uniformly secure final mounting of the airbag is achieved. Another advantage of the clipping is that the fastening device can be attached to the motor vehicle in a manner secured against rotation.

After clipping the fastening device to the motor vehicle, according to one variant of the method according to the invention, the fastening tab is preferably additionally fastened to the fastening device by means of a screw and by means of the opening having the screw thread in the plate. Checking or documenting the correct mounting of the airbag in the motor vehicle can additionally be made by checking the angle of rotation of the screw or by checking the torque acting on the screw.

The airbag, which is configured, for example, as a head airbag, side airbag, or roof-side airbag is provided in a manner known per se to respond very rapidly in the event of a crash and to be filled very rapidly with a gas to thereby protect a person located in the motor vehicle. For this accident scenario it must be ensured that the fastening device does not detach from the motor vehicle. However, this in turn has the consequence that it seemed at least relatively difficult or even impossible to release the fastening device clipped to the motor vehicle from the motor vehicle again without damaging the fastening device or the motor vehicle.

When using the fastening device according to an embodiment of the invention, however, it is relatively easily possible to remove the airbag from the fastening device clipped to the motor vehicle since only the screw, if present, needs to be loosened and the second plate section tilted upward.

Since the fastening device according to an embodiment of the invention has the plate with the screw thread, it is possible, as is provided in one variant of the method according to the invention, to screw a replacement airbag to the fastening device clipped to the motor vehicle.

In contrast to the method according to an embodiment of the invention described above, according to a further method according to an embodiment of the invention, for fastening to the fastening device the airbag is already screwed to this. Checking or documenting correct mounting of the airbag in the motor vehicle can then be made by checking the angle of rotation of the screw or by checking the torque acting on the screw.

For replacement of the airbag which may possibly be necessary, the screw is then merely released from the fastening device clipped to the motor vehicle and the replacement airbag is screwed to the fastening device clipped to the motor vehicle.

In order to reinforce the fastening tab, according to one embodiment of the method according to the invention, the fastening tab preferably comprises a reinforcing plate having an opening through which the screw for fastening the airbag to the fastening device is guided. The reinforcing plate can additionally comprise a first reinforcing plate section and a second reinforcing plate section, which each have an opening and at least partially enclose the fastening tab on both sides in such a manner that the two second openings of the two reinforcing plate sections lie substantially congruently above one another.

According to a further embodiment of the method according to the invention, the fastening device can be designed in such a manner that the plate and the clip device are two separate components, the clip device being clipped to the plate having the screw thread.

The fastening device according to an embodiment of the invention is designed in such a manner that the method according to an embodiment of the invention can be carried out with it. The plate of the fastening device is made, for example, of metal, a metal sheet or steel. The clip device is preferably made of metal.

According to a preferred variant of the fastening device according to an embodiment of the invention, the clip device is designed in such a manner that it is clipped to the plate or the plate comprises a first plate section and a second plate section, wherein the first plate section has the opening with the screw thread and the second plate section can be turned down in such a manner that the plate at least partially encloses the fastening tab on both sides for fastening the airbag to the fastening device.

The fastening device according to an embodiment of the invention is in particular provided for an airbag module which, in addition to the fastening device according to the invention, has an airbag which can be filled with a gas, which has at least one fastening, wherein the fastening tab is screwed tightly to the plate by means of a screw for fastening the airbag to the fastening device.

The airbag can have a reinforcing plate disposed on the fastening tab with an opening through which the screw for fastening the airbag on the fastening device is guided. The reinforcing plate preferably comprises a first reinforcing plate section and a second reinforcing plate section, which each have an opening and at least partially enclose the fastening tab on both sides in such a manner that the two second openings of the two reinforcing plate sections lie substantially congruently one above the other. The reinforcing plate used for the airbag is preferably made of metal, steel, and/or sheet metal.

Advantageous embodiments and further developments of the invention are obtained from the further dependent claims and from the description with reference to the drawings.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1A:
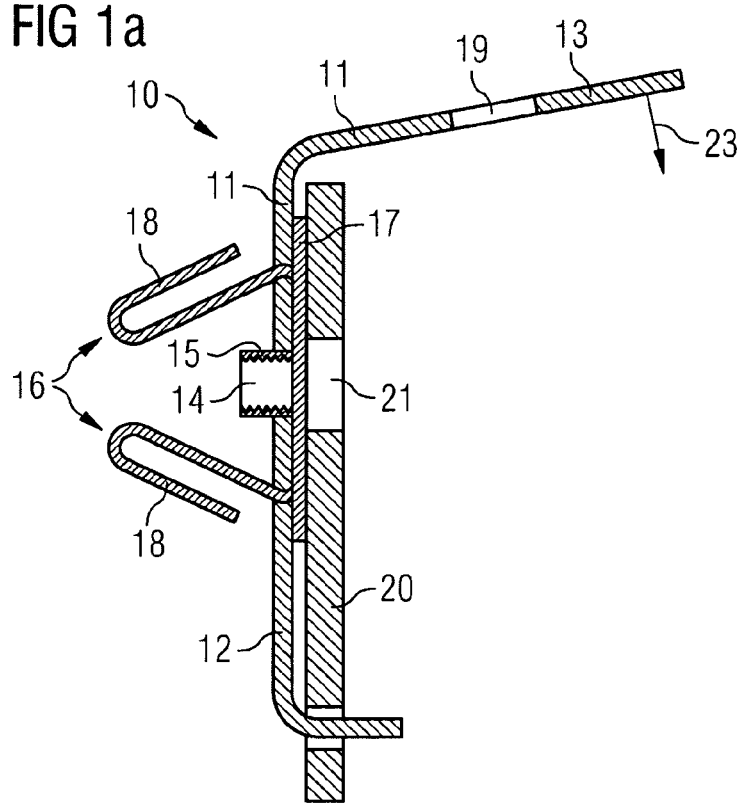
FIG. 1a and FIG. 1b show schematic cross sections of a fastening device with airbag according to the invention to show a first exemplary embodiment.
Figure 1B:
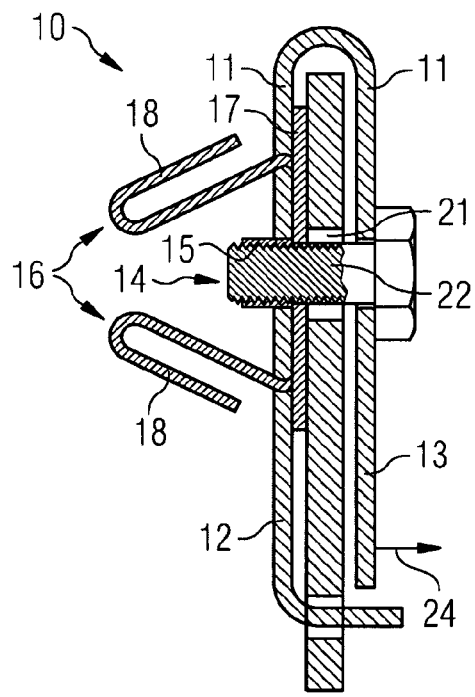

FIG. 1a and FIG. 1b show a fastening device according to an embodiment of the invention for an airbag, which is here designated with reference numeral 10. The fastening device 10 has a fastening, which is formed, for example, as sheet metal. The fastening plate 11 comprises a first plate section 12 and a second plate section 13. The first plate section 12 has an opening 14 with a screw thread 15. The second plate section 13 also has an opening 19.

Furthermore, a clip device 16 is provided, which in the example shown comprises a clip plate 17 and two clip brackets 18 which are fastened to this clip plate 17 and project in a bracket-like manner. As in the example shown, the clip device 16 can be configured in one piece in which the clip brackets 18 and clip plate 17 form a single part, wherein in this case the clip plate 17 is fastened to the fastening plate 11. Alternatively (not shown in FIG. 1a), the clip device 16 can also be configured as two-part or multi-part, for example, by omitting the clip plate 17 and fastening the clip brackets 18 directly to the fastening plate 11.

FIG. 1a and FIG. 1b further show a fastening tab 20 for an airbag not shown here. Unless specified otherwise, airbag should be understood here as merely the air bag, but not the entire airbag module which comprises the airbag housing, the gas generator, and the like. The fastening tab 20 has an opening 21. The fastening tab 20 is applied to the first plate section 12 in such a manner that the opening 21 is in alignment with the opening 14. By means of this opening 21, the fastening tab 20 and with this also the airbag can be fastened with the fastening device 10 and the clip device 16 to a motor vehicle not shown in FIG. 1a and FIG. 1b.

A method for fastening the airbag or the fastening tab 20 of the airbag to a motor vehicle is described hereinafter.

The fastening tab 20 is applied to the first plate section 12 of the fastening device 10 in such a manner that the opening 21 of the fastening tab 20 is disposed in alignment with the opening 14 of the first plate section 12. The second plate section 13 is then bent in the direction 23 until the second plate section 13 encloses the fastening tab 20 on both sides. The fastening tab 20 is therefore clamped to a certain extent in a sandwich manner by two plate sections 12, 13 of the fastening plate 11 (see FIG. 1b). Then, a screw 22 can be inserted through the openings 19, 21 from the side of the second plate section 13 and turned into the thread 15 of the opening 14. In this way, the fastening tab 20 can be fixed very firmly in the fastening plate 11. The fastening device 10 with fastening tab 20 attached thereto can then be clipped by means of the clip device 16 on a motor vehicle and thereby in particular to the bodywork or inner lining thereof. For this purpose, the brackets 18 are inserted into recesses in the bodywork or the inner lining of a motor vehicle provided specifically for this purpose, where they spread out positively and fix the airbag on the bodywork by means of the spring force of the brackets 18.

The particular advantage of this arrangement is that the clip device 16 can be fastened onto the fastening plate 11 beforehand so that during the subsequent screwing of the fastening tab 20 of the airbag, merely this fastening tab 20 must be applied to the fastening plate 11 and the second plate section 13 must be fastened by means of the screw.

Figure 2A:
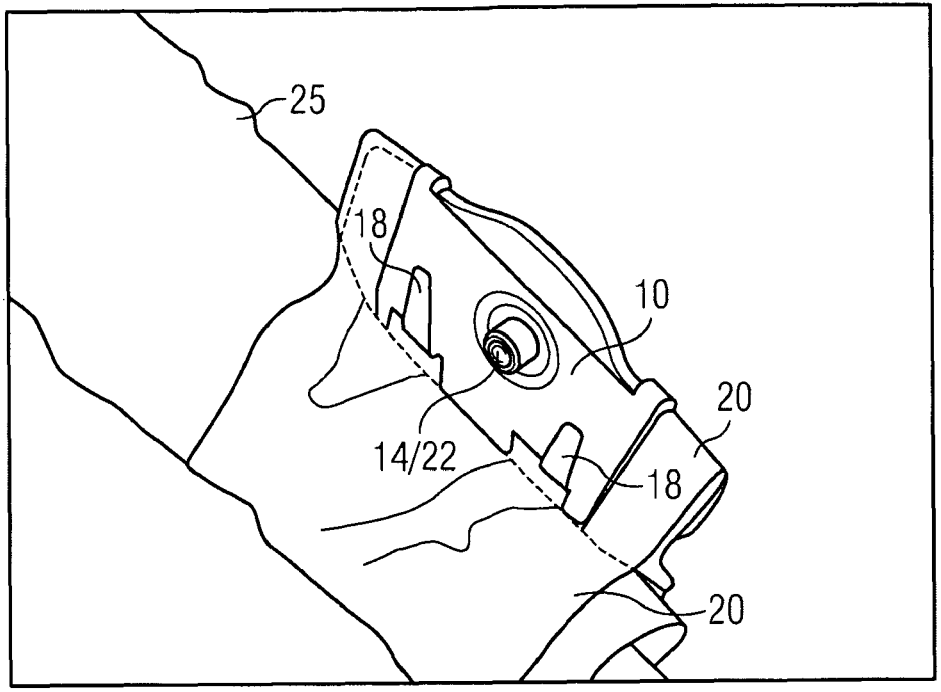
FIG. 2a to FIG. 2c show a fastening device according to the invention with airbag attached thereto in accordance with the exemplary embodiment in FIGS. 1a and 1b.
Figure 2B:
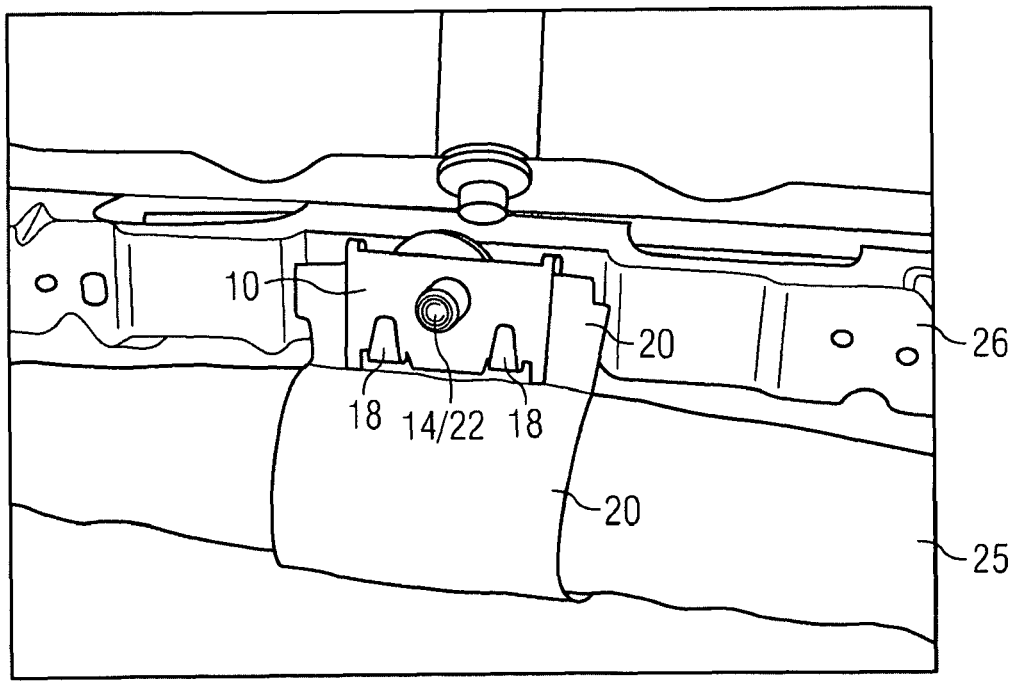
Figure 2C:
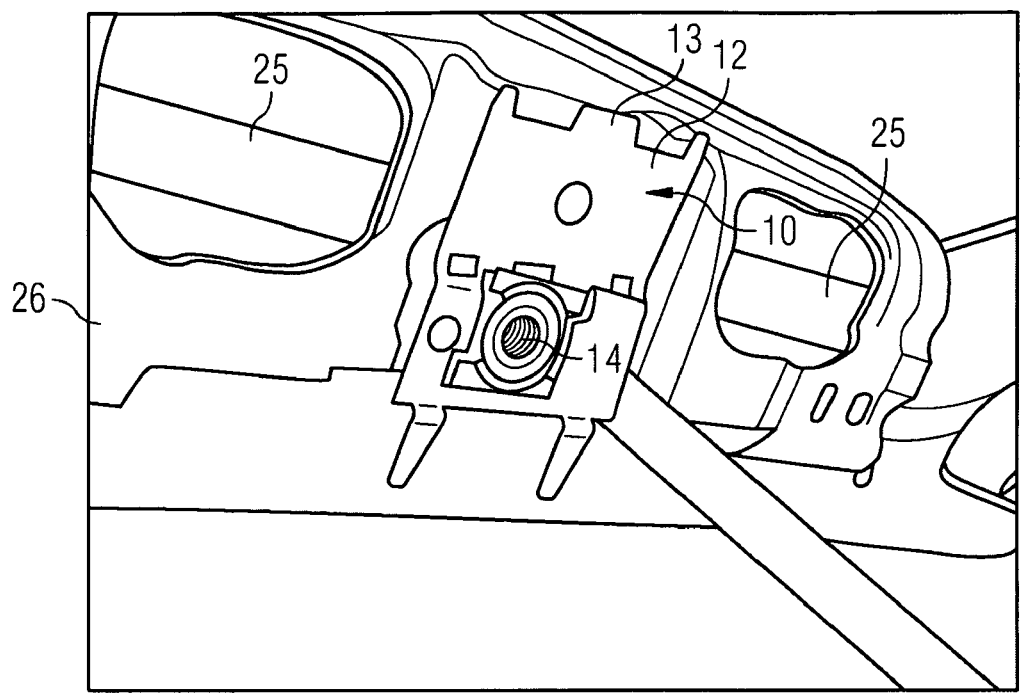

FIGS. 2a-2c show a fastening device with fastening tab 20 and airbag, as shown in FIG. 1a and FIG. 1b. In FIG. 2a the fastening plate 11 encloses the fastening tab 20. The fastening tab 20 furthermore completely encloses the airbag 25. FIG. 2b and FIG. 2c show the fastening device with airbag 25 attached thereto in the mounted state. The fastening device 10 is here fastened to a bodywork part 26 of the motor vehicle, wherein the airbag 25 is inserted here in an at least partially closed space of the bodywork 26.

The particular advantage here is that for dismounting, only the screw 22 need be unscrewed from the thread 15 and removed from the openings 14, 21, 19. Then, merely the plate section 13 needs to be bent in the direction 24, opposite to the direction 23. The fastening tab 20 with the airbag fastened thereto can then be removed and replaced by another, for example, functional replacement airbag.

Figure 3:
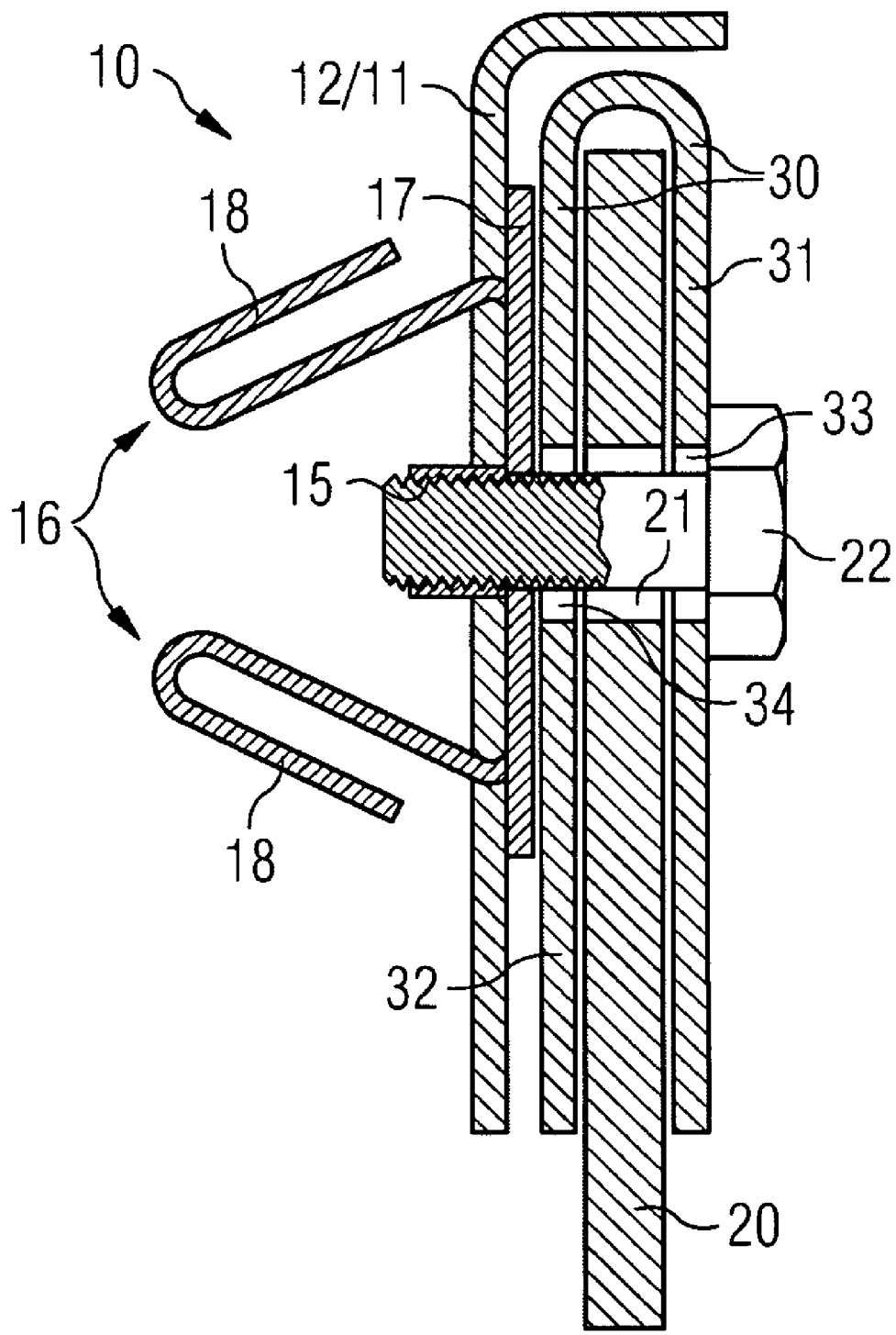
FIG. 3 shows a schematic cross section of a fastening device with airbag according to the invention to show a second exemplary embodiment.

FIG. 3 shows a second exemplary embodiment of a fastening device 10 according to the invention. Unlike the exemplary embodiment in FIGS. 1a, 1b, the fastening plate 11 here merely comprises a single plate section 12, to which the clip device 16 is fastened. In addition, the fastening device 10 here comprises a reinforcing plate 30, which comprises a first reinforcing plate section 31 and a second reinforcing plate section 32. The two reinforcing plate sections 31, 32 each have an opening 33, 34. The reinforcing plate 30 is configured as substantially U-shaped, wherein the two reinforcing plate sections 31, 32 at least partially enclose the fastening tab 20 on both sides and in a sandwich manner, wherein during this enclosure, the openings 33, 34 of the two reinforcing plate sections 31, 32 are substantially congruent above one another and over the opening 21 of the fastening tab 20 and are in alignment with the opening 14 of the fastening plate 11. This reinforcing plate 30 therefore acts to a certain extent as a bracket for the fastening tab and clamps this between its reinforcing plate sections 31, 32.

For mounting, the reinforcing plate 30 can be provided already premounted with the fastening tab 20 of the airbag clamped therein. This reinforcing plate 30 with fastening tab 20 clamped therein must then merely be screwed on the fastening plate 11 and fastened to the bodywork by means of the clip device. For exchange or dismantling of the airbag (dismounting), the reinforcing plate 30 with fastening tab 20 clamped therein must merely be unscrewed again from the fastening plate 11 and can then be replaced, for example, by a replacement airbag.

Although the embodiments of the present invention has been explained in detail hereinbefore with reference to preferred exemplary embodiment, it is not restricted to these but can naturally be modified and amended in manifold ways within the scope of the invention.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A method for fastening an airbag in a motor vehicle, comprising the steps of:
   fastening the airbag, which can be filled with a gas and which has a fastening tab, to a fastening device which comprises a plate and a clip device fastened to the plate and the plate comprises a first plate section with a first opening having a screw thread and a second plate section; and
   bending the second plate section in such a manner that the first plate section and the second plate section at least partially enclose the fastening tab on both sides.

2. The method according to claim 1, further comprising the step of clipping the fastening device on which the airbag is fastened to a bodywork of the motor vehicle.

3. The method according to claim 2, further comprising the steps:
   tilting up the second plate section of the fastening device clipped to the bodywork to release the airbag from the fastening device which remains clipped to the bodywork;
   positioning a fastening tab of a replacement airbag onto the fastening device; and
   bending the second plate section in such a manner that first plate section and the second plate section at least partially enclose the fastening tab of the replacement airbag on both sides.

4. The method according to claim 2, further comprising the step of an additional screwing of the fastening tab to the fastening device clipped to the bodywork with a screw and the first opening of the first plate section having the screw thread.

5. The method according to claim 4, further comprising the steps:
   loosening the screw;
   tiling up the second plate section of the fastening device clipped to the bodywork to release the airbag from the fastening device which remains clipped to the bodywork;
   attaching and screwing a fastening tab of a replacement airbag onto the fastening device; and
   bending the second plate section in such a manner that the first plate section and the second plate section at least partially enclose the fastening tab of the replacement airbag on both sides.

6. The method according to claim 1, wherein the fastening tab comprises a reinforcing plate having at least a second opening, which is substantially congruent with the first opening of the first plate section, when the airbag is fastened to the fastening device.

7. The method according to claim 6, wherein the reinforcing plate comprises a first reinforcing plate section and a second reinforcing plate section, which each have the second opening and at least partially enclose the fastening tab on both sides in such a manner that the two second openings of the two reinforcing plate sections lie substantially congruently above one another.

8. The method for fastening an airbag to a motor vehicle, comprising the steps of:
   fastening the airbag, which can be filled with a gas and which has a fastening tab, to a fastening device which comprises a plate with a first opening having a screw thread and a clip device fastened to the plate;
   screwing the fastening tab with a screw to the plate having the screw thread; and
   thereafter, clipping the fastening device, to which the airbag is fastened, to a bodywork of the motor vehicle.

9. The method according to claim 8, further comprising the steps:
   loosening the screw to release the airbag from the fastening device which remains clipped to the bodywork; and
   screwing a replacement airbag to the fastening device clipped to the bodywork, whereby the airbag may be replaced without removing the fastening device from the bodywork.

10. The method according to claim 8, wherein the fastening tab has a reinforcing plate with at least one second opening through which the screw for fastening the airbag to the fastening device is guided.

11. The method according to claim 10, wherein the reinforcing plate comprises a first reinforcing plate section and a second reinforcing plate section, which each have a second opening and at least partially enclose the fastening tab on both sides in such a manner that the two second openings of the two reinforcing plate sections lie substantially congruently one above the other.

12. The method according claim 8, further comprising the step of clipping the clip device with the plate having the screw thread.

13. A fastening device for an airbag, comprising:
   a plate with a first opening having a screw thread; and
   a clip device fastened to the plate,
   wherein the first opening with the screw thread is clipped to the plate and configured to accommodate a screw for fastening a fastening tab of the airbag which can be filled with a gas, and
   wherein the clip device is configured to be clipped to a motor vehicle for fastening the airbag.

14. An airbag module for a motor vehicle, comprising:
an airbag which can be filled with a gas, which has at least one fastening tab; and
at least one fastening device comprising:
a plate with a first opening having a screw thread; and
a clip device fastened to the plate,
wherein the first opening with the screw thread is configured to accommodate a screw for fastening a fastening tab of the airbag, and
wherein the clip device is configured to be clipped to the motor vehicle for fastening the airbag.

15. The airbag module according to claim 14, wherein a reinforcing plate disposed on the fastening tab is provided, which has at least a second opening, through which the screw for fastening the airbag on the at least one fastening device is guided.

16. The airbag module according to claim 15, wherein the reinforcing plate comprises a first reinforcing plate section and a second reinforcing plate section, which each have the second opening and at least partly enclose the fastening tab on both sides in such a manner that the two second openings of the two reinforcing plate sections lie substantially congruently above one another.

17. A motor vehicle, comprising:
a bodywork;
an inner lining for lining the bodywork; and
an airbag clipped with a fastening device which has at least one fastening tab, the fastening device comprising:
a plate with a first opening having a screw thread; and
a clip device fastened to the plate,
wherein the first opening with the screw thread is configured to accommodate a screw for fastening a fastening tab of the airbag which can be filled with a gas, and
wherein the clip device is configured to be clipped to the motor vehicle for fastening the airbag.

* * * * *